(12) United States Patent
Lerch et al.

(10) Patent No.: US 6,729,466 B2
(45) Date of Patent: May 4, 2004

(54) INJECTION MOLDED AXIS OR ROLLER BODY MADE BY AN INJECTION MOLDED THERMOPLASTIC MATERIALS

(75) Inventors: Stephan Lerch, Oftringen (CH); Thomas Rutishauser, Uerikon (CH)

(73) Assignee: Sarnatech BNL Ltd., North Yorkshire (GB)

( * ) Notice: Subject to any disclaimer, the term of this patent is extended or adjusted under 35 U.S.C. 154(b) by 88 days.

(21) Appl. No.: 10/141,917

(22) Filed: May 10, 2002

(65) Prior Publication Data

US 2002/0132713 A1 Sep. 19, 2002

Related U.S. Application Data

(62) Division of application No. 09/504,946, filed on Feb. 16, 2000, which is a division of application No. 08/891,100, filed on Jul. 10, 1997, now Pat. No. 6,044,963.

(30) Foreign Application Priority Data

Jul. 10, 1996 (CH) .............................................. 1720/96

(51) Int. Cl.⁷ ........................ B65G 13/02; B29C 45/14; F16C 3/02
(52) U.S. Cl. ........................ 198/780; 193/35 F; 193/37; 492/38; 492/39; 492/56
(58) Field of Search .................. 198/780; 193/35 F, 193/37; 492/38, 39, 49, 51, 52, 53, 56; 264/250, 255, 259, 254, 245, 246, 247, 271.1, 275

(56) References Cited

U.S. PATENT DOCUMENTS

| | | | |
|---|---|---|---|
| 4,098,631 A | * 7/1978 | Stryjewski | 156/221 |
| 4,203,509 A | 5/1980 | Thompson et al. | |
| 4,238,446 A | * 12/1980 | Tanaka | 264/250 |
| 4,662,045 A | * 5/1987 | Grodum | 29/895.212 |
| 4,872,247 A | * 10/1989 | Nakamura et al. | 492/40 |
| 4,956,211 A | * 9/1990 | Saito | 428/36.5 |
| 4,984,027 A | * 1/1991 | Derimiggio et al. | 399/331 |
| 5,089,201 A | * 2/1992 | Takahashi | 264/135 |
| 5,433,691 A | 7/1995 | Hiraoka | |
| 5,538,475 A | * 7/1996 | Jaskowiak | 464/181 |
| 5,683,641 A | * 11/1997 | Jaskowiak | 264/267 |
| 5,744,238 A | 4/1998 | Limperis et al. | |
| 5,876,288 A | * 3/1999 | Jaskowiak | 264/267 |
| 5,893,210 A | * 4/1999 | Takei et al. | 29/895.32 |
| 6,044,963 A | * 4/2000 | Lerch et al. | 198/780 |
| 6,059,095 A | * 5/2000 | Tsuji | 198/780 |
| 6,241,619 B1 | * 6/2001 | Russell | 464/183 |
| 6,426,028 B1 | * 7/2002 | Lerch et al. | 264/250 |

FOREIGN PATENT DOCUMENTS

| | | | |
|---|---|---|---|
| EP | 492477 | | 7/1992 |
| GB | 1301652 | | 1/1973 |
| GB | 1386593 | | 3/1975 |
| JP | 57102326 A | * | 6/1982 |
| JP | 59012817 A | * | 1/1984 |
| JP | 04021433 A | * | 1/1992 |
| JP | 04074634 | * | 3/1992 |

* cited by examiner

Primary Examiner—Christopher P. Ellis
Assistant Examiner—Mark A. Deuble
(74) Attorney, Agent, or Firm—Burns, Doane, Swecker & Mathis, L.L.P.

(57) ABSTRACT

A roller body having a shaft formed from a first thermoplastic material and defining at least one roller. The shaft is a single component injection-molded shaft. A casing at least partially encases the roller and is formed from a second thermoplastic material different from the first thermoplastic material. The casing is bonded to the roller by an injection-molding process.

4 Claims, 2 Drawing Sheets

INJECTION MOLDED AXIS OR ROLLER BODY MADE BY AN INJECTION MOLDED THERMOPLASTIC MATERIALS

This application is a divisional of application Ser. No. 09/504,946, filed on Feb. 16, 2000, which is a divisional of application Ser. No. 08/891,100, filed on Jul. 10, 1997, now U.S. Pat. No. 6,044,963.

BACKGROUND OF THE INVENTION

FIELD OF THE INVENTION

The present invention relates to an axis or a roller body on the basis of at least one first thermoplastic material which is processable in an injection molding process.

This invention refers also to a method of producing this axis or this roller body, and the use of this axis or roller body, as well.

DESCRIPTION OF THE RELATED ART

Conventional rollers include an axis produced of metal or alloys.

This axis is bonded in a separate production step manually or mechanically to one or several rubber roller(s) or to one or several roller(s) of a thermoplastic material.

This bond may be an adhesive bonding, a pressing on, an engaging, etc.

These rubber rollers can, however, be directly vulcanised onto this axis.

Before such rollers can be used in modern electronic appliances such as printers, labelling machines, photo copy apparatuses, fax machines, etc., an extensive surface treatment such as grinding, roughening, etc. of the roller(s) is necessary.

Due to the various materials, the processing of and post processing such rollers is correspondingly expensive.

In order to achieve the desired geometry at the metal axis, such as for instance the diameter of the shaft, grooves, driving elements, etc., extensive post-treatments are necessary.

The natural large weight and also the possible electrostatic charging of the metal axis can have negative influences.

In order to minimize the drawbacks and the restrictions in selecting the geometry at the metal axis, axes have been developed on the basis of plastic materials.

Such conventional plastic material axes incorporate, however, still the drawback of the separate assembling of the roller of rubber or of a thermoplastic material, coupled with the above mentioned extensive, surface treatment.

In the JP-A-03-24926 a method of producing guide rollers for the use in video cassette apparatuses (video tape recorder, VTR) and in cassette tapes for VTR is described.

Until the date of this Japanese invention such guide rollers were produced of only one single material.

This had the following drawbacks:

At the outer portions of such guide rollers recessed areas occur which necessitate a post-treatment by a machine.

Furthermore, when selecting materials always a compromise between glideability and wear resistance had to be reached.

According to JP-A-03-24926 these drawbacks are eliminated by the use of 2 different materials.

According to this method an inner part of such a guide roller is produced in a first station of a two colour injection machine.

The material for this inner part has self-lubricating properties.

In the second station of mentioned machine at least the entire outer cylinder shaped surface of the mentioned inner part is coated by such a second material which is wear resistant and makes up the outer surface of the guide roller.

This method is only suitable for the production of small (length between 0.5 mm to 3 mm) parts with a simple, cylinder shaped geometry.

At the area of contact between these two materials difficulties in respect of the bond between the materials can occur.

In the JP-A-60-199 622 a method of producing rollers on the basis of synthetic resins is described.

This method incorporates the following steps:
(a) a first crystalline resin is injection molded around an inlay part in the form of a metal axis;
(b) a second crystalline resin is injection molded around the inlay part obtained by the step (a).

The accordingly obtained product must be cut at its outermost surface and at its ends and must be polished.

This method has been developed in order to avoid enclosures of air and recessed areas at roller bodies with larger diameters (about 30 mm).

In the EP 0 492 477 A2 parts for an application in electrostatographic reproduction apparatuses are described.

The part described in the FIGS. 6 to 8 has the following structure:

A hollow tube shaped part 30 of the materials aluminum, copper, stainless steel or other steel alloys is filled out and partly enclosed by a setting and flowable material.

The part 30 has slots 31 through which the settable and flowable material may exit.

By this exit the cavity in the corresponding injection molding tool is filled, resulting in the desired functional shape of the now filled roller 69.

In a second shaping operation a coating 68, such as for instance a formed elastomer, can be deposited onto this roller 69.

According to GB 1 386 593 a polycarbonate for a rotating element, such as for instance a roller or a wheel, is produced in a first step in a first conventional injection molding tool.

The rotating element obtained in this manner is thereafter placed into a second injection molding tool and encased by a hoop of polyurethane.

According to GB 1 301 652 a base body having a specific shape is produced in a first step in a first conventional injection molding tool.

This base body may consist of a plastic material, such as for instance polypropylene.

This base body obtained in this manner, which also could be made of metal, is thereafter placed into a second injection molding tool and encased by a hoop of a plastic material, such as for instance a plastified polyvinylchloride.

Due to the specially shaped base body a good and safe positioning of the hoop is arrived at.

SUMMARY OF THE INVENTION

It is now an object of the present invention to overcome the above mentioned drawbacks.

It is a further object of the present invention to provide an axis or a roller body, which can be produced by a simple and economical method.

This axis or this roller body shall be made exclusively of thermoplastic materials processable in an injection molding process.

The bond between the respective used thermoplastic materials shall be durable.

This bond shall be arrived at without the aid of further additional materials such as adhesive agents, mounting elements, assembling aids, etc., and without outer influences such as pressure, ultra sonics, etc.

The respective used thermoplastic materials shall be able to be mutually harmonised with each other and be adaptable to the respective purpose of use.

The respective enlisted materials shall be made to specifically suit the respective required qualities of stability, dimension, wear, adhesiveness, hardness and friction in order to provide an optimal economical benefit.

The respective desired geometries of this axis or of this roller body shall be realisable and reproducible in an easy manner and in a series production.

The various elements of this axis or roller body, such as
the elements which have the function of a roller, and
the elements which have the function of the supporting, and also possibly
the driving elements,
the stabilizing elements,
the function- and/or constructional elements, and
the elements which contribute to the improvement and simplification of the squeezing off during the injection molding process, shall be optimally harmoniseable and combinable with each other in order to allow for the respective requirements the best possible solutions.

This axis or this roller body shall meet the respective requirements regarding straightness, trueness, cylindericity, coaxiality and true running.

The above mentioned objects are met by the axis or by the roller body structured in accordance with the invention.

The inventive axis or roller body on the basis of at least one first thermoplastic material which is processable in an injection molding process, which incorporates the respective desired qualities, whereby this axis or this roller body
has at least one first element 1 which has the function of a roller, and
has at least one second element 2 which has the function of the support,
and possibly includes
at least one driving element 3,
at least one stabilizing element 4,
at least one function and/or constructional element 5, such as cams, keyways, grooves, levers, pins, bolts, bore holes, dogs, and
at least one third element 6, which contributes to the improving and simplification of the squeezing off during the injection process,
is characterized in that the respective desired number of said first elements 1 is completely or in part encased by at least one second thermoplastic material which is processable in an injection moulding process and includes the respective required qualities, and
that the respective thermoplastic materials form together an adhesive or cohesive or mechanical bond attained by the injection molding process, and whereby this bond has been arrived at without the aid of additional materials or outer influences.

The method in accordance with the invention for producing the axis in accordance with the invention or the roller body in accordance with the invention is characterised in that
in a first step the base body with the desired number, shape and dimensions of the elements 1, 2, 3, 4, 5, 6, 7 is produced in an injection molding tool by means of an injection molding process on the basis of the first thermoplastic material, and
in a second step the respective desired number of first elements 1 on the accordingly obtained base body is encased in an injection molding tool by means of an injection molding process completely or partly by a second thermoplastic material, whereby an adhesive or cohesive or mechanical bond is formed between the mentioned two thermoplastic materials, and whereby this bond is formed without the aid of further additional materials or outer influences.

The axis or roller body in accordance with the invention can be used
for a conveying and/or transporting of recording mediums in the form of an individual sheet, a band or an endless roll, for instance picture and/or character carriers, specifically on the basis of plastic materials, metals, metal alloys, papers, cardboard, such as bank notes, inscribed or printed papers; and
for a conveying and/or transporting of articles, such as wood, plastic material or stone slabs, containers, such as bottles, glasses, plastic material boxes, tools.

In the following portion possible embodiments of the present invention are described with reference to the FIGS. 1 to 5.

DETAILED DESCRIPTION OF THE PREFERRED EMBODIMENTS

Figure 1:
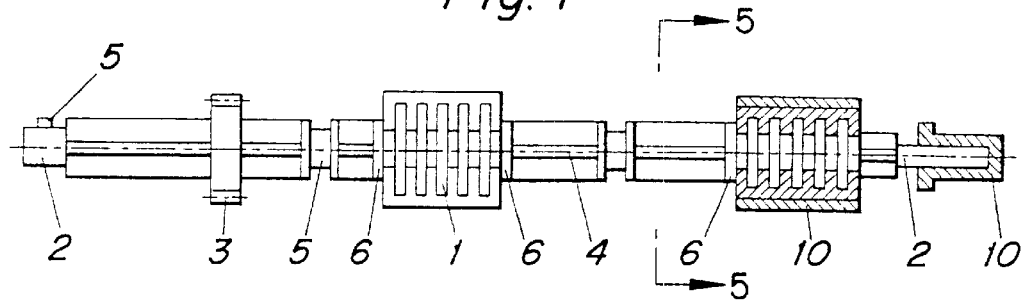
FIG. 1 illustrates a schematical longitudinal section of an axis in accordance with the invention for the use in a sheet feeding system.
Figure 2A:
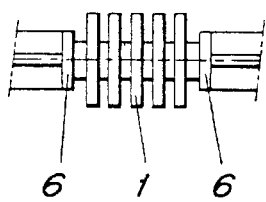
FIGS. 2*a* to 2*f* illustrate possible shapes of the first element 1 which has the function of a roller.
Figure 2B:
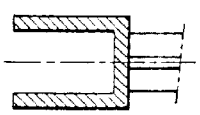
Figure 2C:
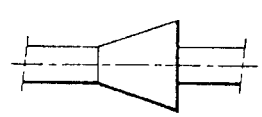
Figure 2D:
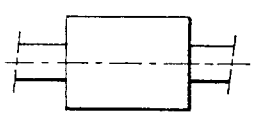
Figure 2E:
Figure 2F:
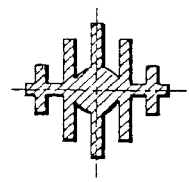
Figure 2G:
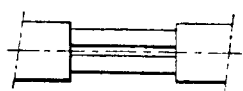
Figure 2H:
Figure 3A:
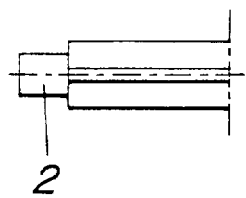
FIGS. 3*a* to 3*d* illustrate possible shapes of the second element 2 which has the function of the support.
Figure 3B:
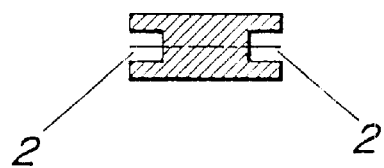
Figure 3C:
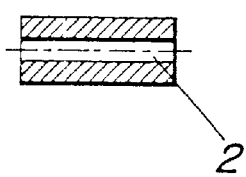
Figure 3D:
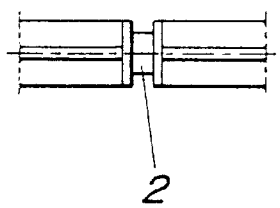
Figure 4A:
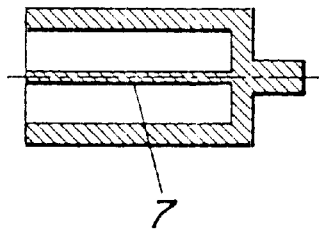
FIG. 4 illustrates a cross section through a tube like structured first element 1, in which reinforcing ribs 7 are present.
Figure 4B:
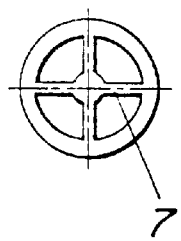
Figure 5:
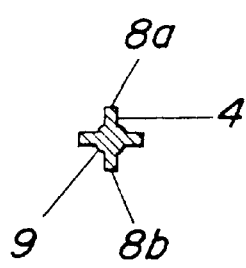
FIG. 5 illustrates a possible cross section along the axis A–A' through an axis in accordance with the invention.
Figure 6:
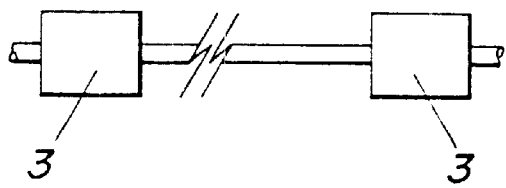
FIG. 6 illustrates a side elevational view of a shaft in accordance with the present invention, including a plurality of drive elements.
Figure 7:
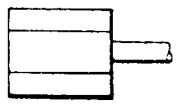
FIG. 7 illustrates a side elevational view of a shaft in accordance with the present invention, in which a multi-edged drive element is positioned at the end of a shaft.

The axis illustrated in FIG. 1 has a length of about 260 mm to about 300 mm.

The measure from the one outer surface 8*a* of the stabilizing element 4 to the opposite surface 8*b* of the stabilizing element 4 amounts from 6 mm to 15 mm, specifically from 5 mm to 12 mm.

The individual stabilizing elements 4 are preferably interconnected with regard to a torsional strength and a bending strength with a cross section enlargement 9.

From two to eight, preferably four stabilizing elements 4 are specifically suitable.

The function and/or constructional element 5 can serve also for the supporting.

The driving element 3 is designed as gear wheel, for instance with 15 to 60 teeth.

The two second elements 2 are each designed as shaft with a diameter of 4 mm to 8 mm.

Both first elements 1 are of a lamella shaped structure.

The outer diameter of these lamellas amounts to from 8 mm to 30 mm, specifically from 10 mm to 20 mm.

The inner diameter of these lamellas amounts to from 3 mm to 6 mm.

The wall thickness of the individual lamellas amounts to from 0.8 to 3 mm.

The number of the first elements 1 present depends in general from the respective application of the axis or roller body structured in accordance with the invention.

Thus, 1 to 30 of such first elements 1 may be present. The dimensioning of these first elements 1 depends also from the respective application of the axis or roller body structured in accordance with the invention and from the respective number of first elements 1 present.

The first elements 1 illustrated in FIG. 1 can have a length from 4 mm to 250 mm, specifically from 10 mm to 50 mm.

The three third elements 6 present contribute to the improvement and simplification of the squeezing off during the subsequent injection processes.

The parts described until here form the base body which in the method according to the invention is produced in the first step on the basis of a first thermoplastic material, for instance a polyarylamide, such as a product IXEF of the company Solvay S.A.

In a second step the respective desired number of first elements 1 of this base body are encased completely or partly by a second thermoplastic material, for instance a styrene-block-copolymer, SEBS, such as for instance Thermoflex of the company PTS.

In a third step the respective desired number of the first elements 1 which in the second step have been completely or partly encased with the second thermoplastic material and/or the respective desired number of first elements 1, which have not been encased in the second step with the second thermoplastic material, and/or the respective desired number of second elements 2 can be encased completely or partly by a third thermoplastic material 10.

Between the respective thermoplastic materials an adhesive or cohesive or mechanical bond is formed.

This bond is formed without the aid of further additional materials or outer influences.

The above mentioned steps are performed preferably in a multi-component injection molding tool in a multi-component injection molding process.

The lamella shaped formed first elements 1 which are encased by the second or third thermoplastic materials have an outer diameter of 10 mm to 35 mm, specifically 12 mm to 25 mm.

It is preferred that the third thermoplastic material is injection molded onto these areas with a material thickness of about 0.8 mm to about 3 mm.

The second elements 2 are encased with the third thermoplastic material 10, specifically with a material thickness of about 1 mm to 2.5 mm, mainly for the reason to obtain an improved supporting and in order to arrive at a more economical assembling of the bearing bushes.

A surface treatment in accordance with the complicate kind mentioned above is in most of the cases no longer needed.

In the present invention the following reference numerals are used.

1 first element which has the function of a roller
2 second element which has the function of the support
3 driving element
4 stabilizing element
5 function and/or constructional element
6 third element, which contributes to the improving and simplification of the squeezing off during the subsequent injection processes
7 reinforcing ribs
8a, 8b surfaces of the stabilizing element
9 cross section enlargement
10 third thermoplastic material.

What is claimed is:

1. A process of using a roller body, the roller body comprising a shaft formed from a first thermoplastic material, said shaft defining a plurality of elements at spaced apart locations along the length of said shaft and including at least one roller, said shaft including stabilizing ribs extending longitudinally along said shaft between the locations of at least some of said elements, and said shaft being a single component injection-molded shaft, and a casing that at least partially encases said roller and is formed from a second thermoplastic material different than said first thermoplastic material, said casing being bonded to said roller, the process comprising:

conveying recording medium with said roller body, the recording medium being an individual sheet, a band, or an endless roll, the recording medium formed of a material selected from the group consisting of plastic materials, metals, metal alloys, papers, and cardboard.

2. A process of using a roller body, the roller body comprising a shaft formed from a first thermoplastic material, said shaft defining a plurality of elements at spaced apart locations along the length of said shaft and including at least one roller, said shaft including stabilizing ribs extending longitudinally along said shaft between the locations of at least some of said elements, and said shaft being a single component injection-molded shaft, and a casing that at least partially encases said roller and is formed from a second thermoplastic material different than said first thermoplastic material, said casing being bonded to said roller, the process comprising:

conveying elements selected from the group consisting of articles, containers, and tools, the articles selected from the group consisting of wood, plastic material, and stone slabs, the containers selected from the group consisting of bottles, glasses, plastic material boxes.

3. A process of using a roller body, the roller body comprising a shaft formed from a first thermoplastic material, said shaft defining at least one roller including a plurality of substantially parallel disc portions extending radially of said shaft in spaced apart relationship to one another longitudinally along the roller, said shaft being a single component injection-molded shaft, and a casing that at least partially encases said roller and enters the spaces between said disc portions, said casing being formed from a second thermoplastic material different than said first thermoplastic material, and said casing being bonded to said roller, the process comprising:

conveying recording medium with said roller body, the recording medium being an individual sheet, a band, or an endless roll, the recording medium formed of a material selected from the group consisting of plastic materials, metals, metal alloys, papers, and cardboard.

4. A process of using a roller body, the roller body comprising a shaft formed from a first thermoplastic material, said shaft defining at least one roller including a plurality of substantially parallel disc portions extending radially of said shaft in spaced apart relationship to one another longitudinally along the roller, said shaft being a single component injection-molded shaft, and a casing that at least partially encases said roller and enters the spaces between said disc portions, said casing being formed from a second thermoplastic material different than said first thermoplastic material, and said casing being bonded to said roller, the process comprising:

conveying elements selected from the group consisting of articles, containers, and tools, the articles selected from the group consisting of wood, plastic material, and stone slabs, the containers selected from the group consisting of bottles, glasses, plastic material boxes.

* * * * *